(12) United States Patent
Cook et al.

(10) Patent No.: US 7,254,339 B2
(45) Date of Patent: Aug. 7, 2007

(54) POWER CONTROLLING NETWORK ELEMENT

(75) Inventors: Paul A Cook, Jacksdale (GB); Jonathan D Oldershaw, Wollaton (GB)

(73) Assignee: Ericsson AB, Stockholm (SE)

( * ) Notice: Subject to any disclaimer, the term of this patent is extended or adjusted under 35 U.S.C. 154(b) by 636 days.

(21) Appl. No.: 10/239,381

(22) PCT Filed: Mar. 16, 2001

(86) PCT No.: PCT/GB01/01160

§ 371 (c)(1),
(2), (4) Date: Sep. 20, 2002

(87) PCT Pub. No.: WO01/73982

PCT Pub. Date: Oct. 4, 2001

(65) Prior Publication Data

US 2003/0138255 A1    Jul. 24, 2003

(30) Foreign Application Priority Data

Mar. 25, 2000    (GB) ................. 0007241.3

(51) Int. Cl.
*H04B 10/08*    (2006.01)
*H04B 10/02*    (2006.01)
*H04J 14/02*    (2006.01)

(52) U.S. Cl. .................... 398/94; 398/38; 398/33; 398/177

(58) Field of Classification Search .............. 398/33, 398/37, 38, 94, 97, 157, 160, 175, 177, 197
See application file for complete search history.

(56) References Cited

U.S. PATENT DOCUMENTS 5,440,418 A * 8/1995 Ishimura et al. ............ 398/181

(Continued)

FOREIGN PATENT DOCUMENTS

EP    0 914 015 A2    5/1999

(Continued)

*Primary Examiner*—Dalzid Singh
(74) *Attorney, Agent, or Firm*—Kirschstein, et al.

(57) ABSTRACT

A power controlling network element for a communication system includes a detector for measuring radiation power present in components of radiation; element parts, for example a channel control unit (CCU), transponders and other modules, for at least one of: (i) transmitting to the detector at least some components of input radiation received at the elements parts from the system; and (ii) generating one or more components of radiation and emitting the one or more components to the detector; and a field programmable gate array (FPGA) for receiving data from the detector indicative of radiation power in the components of radiation received at the detector, and for controlling radiation power emitted from or transmitted through the aforementioned element parts so that the components of radiation received at the detector are regulated in power to within predetermined power limits. Such an element is by virtue of the detector and the FPGA capable of providing accurately controlled radiation components which are not subject to overshoot or unacceptable drift.

11 Claims, 2 Drawing Sheets

U.S. PATENT DOCUMENTS

| | | |
|---|---|---|
| 5,570,227 A | 10/1996 | Nabeyama et al. |
| 5,675,432 A * | 10/1997 | Kosaka .................. 359/337.13 |
| 5,805,322 A | 9/1998 | Tomofuji |
| 5,907,429 A | 5/1999 | Sugata |
| 6,064,501 A * | 5/2000 | Roberts et al. ................ 398/11 |
| 6,389,046 B1 * | 5/2002 | Stayt et al. ............... 372/29.02 |
| 6,392,769 B1 * | 5/2002 | Ford et al. ..................... 398/9 |

FOREIGN PATENT DOCUMENTS

| | | |
|---|---|---|
| EP | 0 936 759 A2 | 8/1999 |
| GB | 2 310 094 A | 8/1997 |
| GB | 2 324 667 A | 10/1998 |
| GB | 00007241.3 | 8/2000 |
| WO | WO 99/17485 | 4/1999 |

* cited by examiner

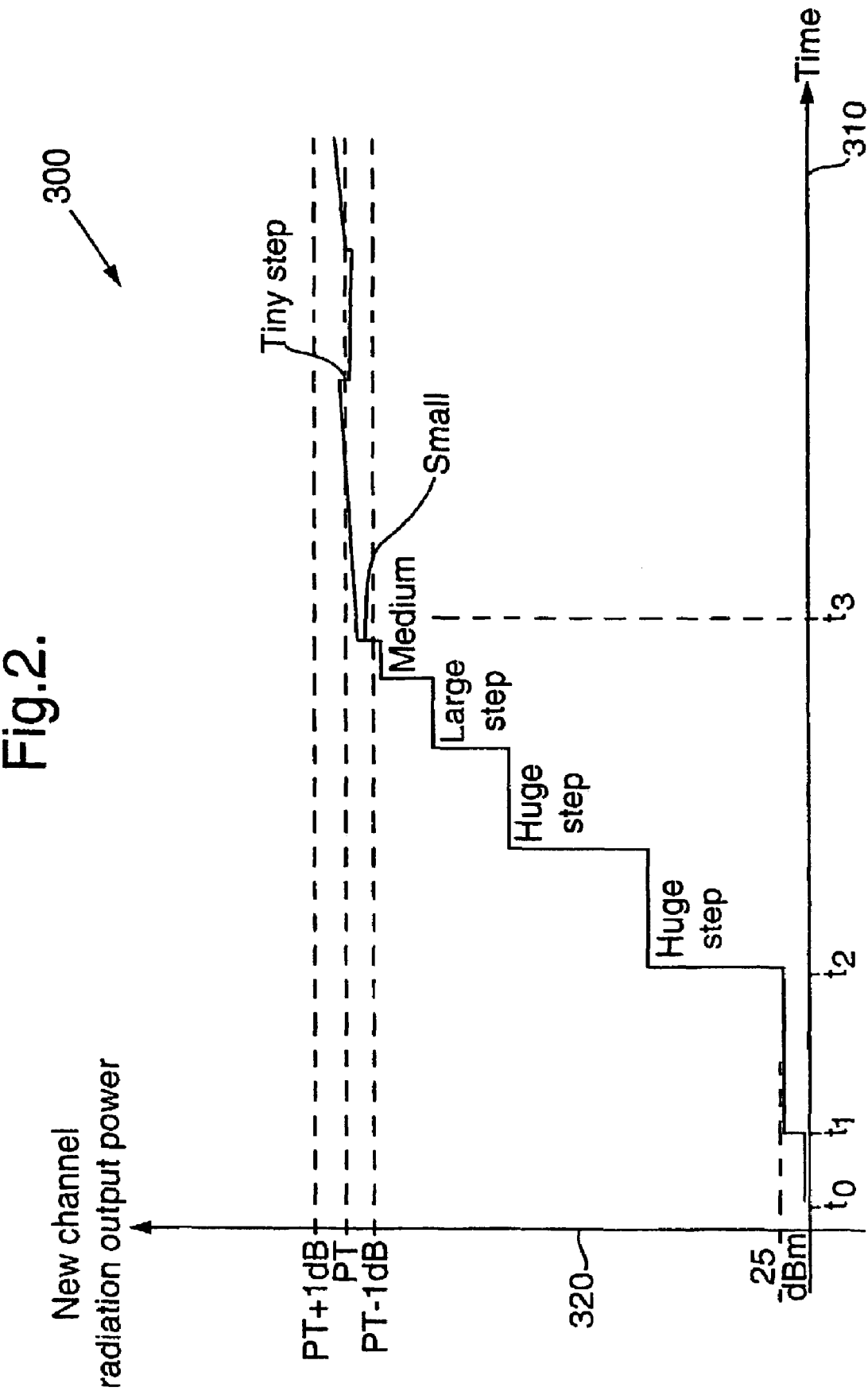

POWER CONTROLLING NETWORK ELEMENT

The present invention relates to a power controlling network element for use in optical communication systems. The invention also relates to a method of adding a channel to such an element.

Conventional optical communication systems routinely now employ wavelength division multiplexing (WDM) where radiation propagating in the systems is partitioned into a plurality of wavebands, each waveband associated with an optical channel of the system. Future designs of communication system will include, for example, 32 channels spaced at wavelength intervals of 0.8 nm; such a spacing corresponds to a channel frequency separation of approximately 100 GHz for optical radiation of nominally 1.5 µm wavelength.

When optical radiation propagates within the systems, the optical radiation propagates through a number of optical components which have non-uniform spectral responses which tends to accentuate radiation power associated with some channels relative to other channels. Such accentuation can result in problems in erbium doped fibre amplifiers (EDFAs) which are employed within the conventional systems for boosting radiation levels, for example at repeater nodes within the systems.

A further problem encountered in the communication systems is adding and removing channels without causing disruption to existing established channels or causing radiation power surges which can interfere with existing channels being amplified in EDFAs.

EDFAs are inherently non-linear devices; composite radiation comprising a number of radiation components input into an EDFA where one of the components has an amplitude considerably greater than the other components can cause the EDFA to predominantly use its pumping input energy to amplify the component of greater amplitude to the detriment of the other channels causing data errors to arise in the other channels.

In order to address these problems, the inventor has devised a power controlling network element which is capable of controlling channel radiation amplitude as well as adding and removing channels in a controlled manner without causing overload effects in optical devices such as EDFAs which receive radiation from the network element.

According to a first aspect of the invention, there is provided a power controlling network element for a wavelength division multiplex (WDM) communication system in which radiation propagating in the system is partitioned into a plurality of wavebands, each waveband being associated with an optical channel, the element being for controlling the power of one or more optical channels being transmitted through the element and for controlling the power of one or more new optical channels being added at the element, the element being characterised by:

(a) measuring means for measuring power of optical channels received thereat;
(b) generating means for:
  (i) transmitting to the measuring means at least some optical channels of input radiation received at the generating means from the system; and for
  (ii) generating the one or more new optical channels being added at the element and emitting said one or more new optical channels to the measuring means; and
(c) controlling means for receiving data from the measuring means indicative of power of each optical channel received at the measuring means, and for controlling the power of each optical channel;

and wherein said one or more optical channels are generated in a stepwise incremental manner, thereby reducing power overshoot in said one or more new optical channels as measured by the measuring means.

The element provides the advantage that it is capable of adding the one or more new optical channels (radiation components) without causing overload or overshoot in the element and the system connected down-stream.

The one or more new optical channels are preferably initially added by the element at a power level insufficient to disrupt existing optical channels but sufficient for the measuring means to detect them, thereby enabling the controlling means to determine whether or not said one or more new optical channels are mistuned (i.e. at a correct waveband).

The controlling means is preferably operable to instruct the generating means to increase radiation power of said one or more new optical channels initially in relatively larger incremental power steps and then subsequently in progressively smaller power steps as the radiation power of said one or more new optical channels approaches a predetermined power level. Use of such graded incremental power steps ensures that the element adds the one or more new optical channels as promptly as possible.

When the one or more new optical channels have been added, it is beneficial for the controlling means to instruct the generating means to maintain the radiation power level of said one or more new optical channels within a error band including the predetermined power level. Control within a error band imposes known limits over which radiation power is maintained.

Preferably, the controlling means is operable to generate an alarm signal when it has to instruct the generating means to modify the radiation power of said one or more new optical channels ts cumulatively by more than the error band. Generation of such an alarm signal enables the system to take corrective action if necessary, for example requesting the element to switch off the one or more new channels.

Advantageously, the error band is modified to accommodate longer-term ageing and drift within the element. Such accommodation of ageing effects enables the element to be run continuously over long periods, for example years, without element part ageing causing spurious operation of the element.

Preferably, the radiation received at the measuring means is a portion of radiation output from the element to the communication system. By sampling the radiation output from the element, the element is capable of correcting for the wavelength response of all parts affecting radiation propagating in the element.

The element conveniently includes optical amplifying means for amplifying radiation output from the generating means to provide the radiation output from the element, the amplifying means including a subsidiary output for providing the portion of radiation for the measuring means. Inclusion of the amplifying means enables the element to compensate for attenuation occurring therein, for example in the generating means when it is transmitting optical channels received at the element from the system up-stream.

Preferably, the controlling means is operable to output instructions repetitively to the generating means, the instructions including identification means which is incremented when a new command is issued. Such operation provides the advantage that the instructions are sent out repetitively so that temporary interruption of the instructions does not necessarily mean that commands are not responded to correctly.

In the element, it is important not to disrupt established optical channels when introducing one or more new channels. As a precaution, it is preferable that the controlling means is operable:
(a) to monitor radiation received at the measuring means;
(b) to determine whether or not unintended radiation is present at wavelengths corresponding to optical channels which the generating means has not been instructed to transmit or generate; and
(c) to instruct the generating means not to emit or transmit radiation at radiation wavelengths corresponding to the optical channel.

Disrupting established optical channels conveying communication traffic can appear as system unreliability to system clients and is therefore preferable avoided.

Advantageously, the generating means includes a channel control unit (CCU) for selectively transmitting one or more optical channels received from the system at the unit. Such units are highly versatile and enable considerable functionality to be thereby built into the element.

In order to render the element physically compact, it is desirable that the controlling means is implemented as a field programmable gate array (FPGA). Use of the FPGA enables the element to be reconfigured, if necessary, to operate in an alternative manner without having to redesign hardware components of the element.

In a second aspect, the invention provides a method of adding one or more new optical channels at an element according to the first aspect of the invention, the method including the steps of:
(a) instructing the generating means to transmit or generate said one or more new optical channels at a power level insufficient to disrupt existing optical channels in the element but sufficient for the measuring means to detect said one or more new optical channels;
(b) monitoring said one or more new optical channels at the measuring means and controlling means for determining whether or not said one or more new optical channels are mistuned;
(c) when said one or more optical channels are not mistuned, instructing the generating means to increase radiation power of said one or more new optical channels in a stepwise incremental manner until their radiation power is within an error band centred about a predetermined power limit.

An embodiment of the invention will now be described, by way of example only, with reference to the following diagrams in which:

FIG. 2 is a diagram of power leveling control provided by the element in FIG. 1: and FIG. 3 is a flow chart depicting operation of the invention.

Figure 1:
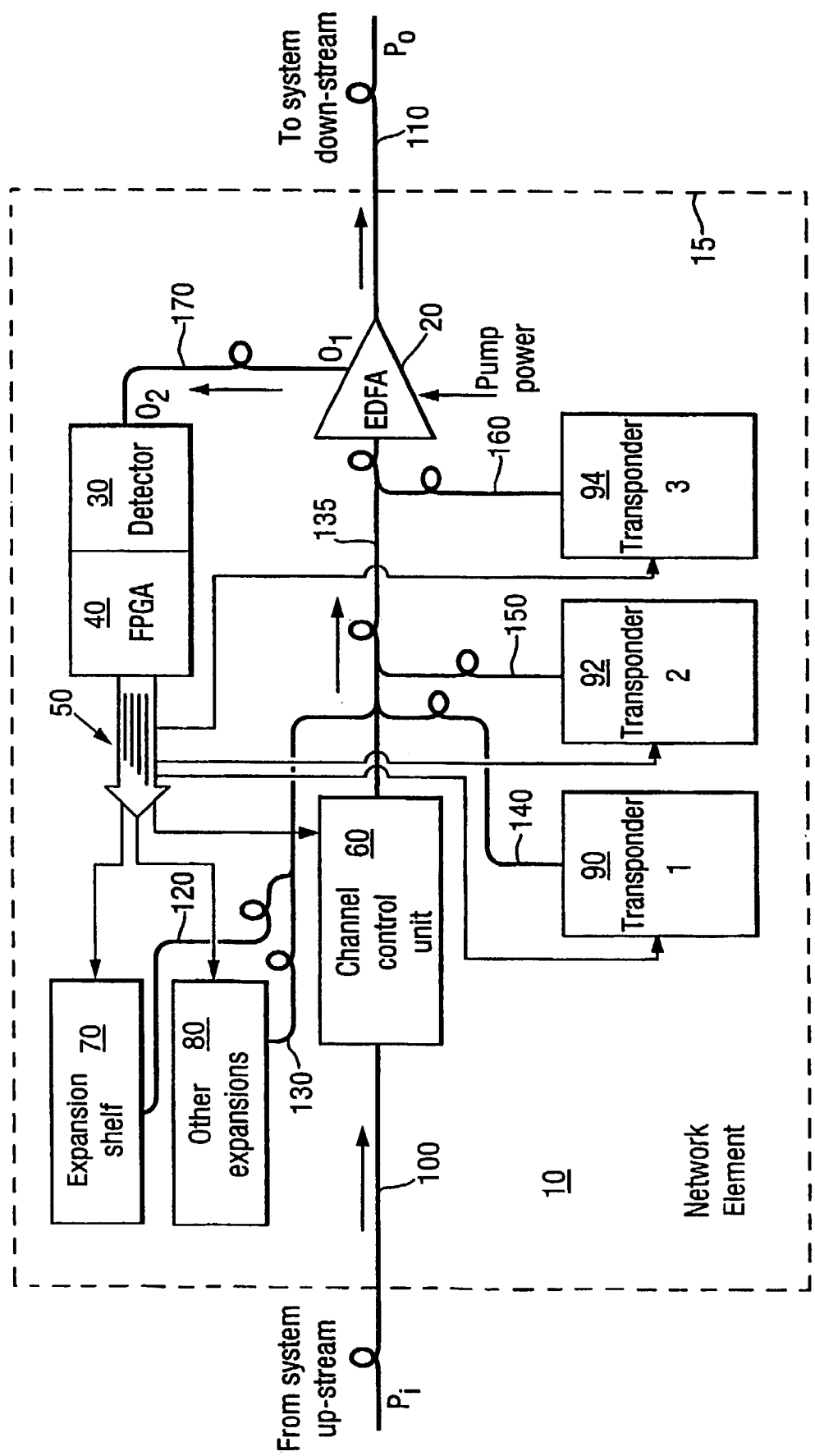
FIG. 1 is a schematic illustration of a power controlling network element according to the invention.

Referring to FIG. 1, there is shown a power controlling network element 10 included within a dashed line 15. The element 10 comprises a erbium-doped optical fibre amplifier (EDFA) 20, an optical detector 30, a field programmable gate array (FPGA) 40 connected to an IEEE1394 data bus 50, a channel control unit (CCU) 60, an expansion shelf 70, an expansions area 80 and three transponders 90, 92, 94. The element 10 further comprises a first optical fibre waveguide 100 connected from up-stream communications equipment (not shown) to an optical input port of the CCU 60, a second optical fibre waveguide 110 connected to an optical output port of the EDFA 20 to provide radiation to down-stream communications equipment (not shown), and third and fourth optical fibre waveguides 120, 130 connected from the shelf 70 and the area 80 respectively into a fifth optical fibre waveguide 135 connected from an optical output port of the CCU 60 to an optical input port of the EDFA 20. The element 10 additionally comprises sixth, seventh and eighth optical fibre waveguides 140, 150, 160 connected from optical output ports of the transponders 90, 92, 94 respectively to couple into the fifth waveguide 135. Lastly, the element 10 includes a ninth optical fibre waveguide 170 connected from an output tap point $O_1$ of the EDFA 20 to an optical input port $O_2$ of the detector 20.

The FPGA 40 is electrically connected via its bus 50 to control inputs of the CCU 60, to modules in the shelf 70 and the expansions area 80, and to the three transponders 90, 92, 94.

The CCU 60 is a proprietary module manufactured by Marconi Communications Ltd. and includes a subsystem manufactured by a vendor in the USA. The CCU 60 comprises free-path optics, optical filters, and a liquid crystal matrix of windows which can be directed to selectively attenuate radiation received thereat and transmitted therethrough. The filters are operable to separate radiation received at the CCU 60 from the fibre waveguide 100 into a plurality of rays, each ray corresponding to one of the 32 channels of the element 10. Each window of the matrix is capable of receiving its associated ray and thereby selectively transmitting and attenuating radiation corresponding to its associated channel to the fibre waveguide 135. The CCU 60 exhibits a minimum insertion loss of 6 dB and radiation of each channel propagating therethrough can be attenuated in a range of 6 to 36 dB. The matrix has associated therewith control electronic circuits which interface to the bus 50 or directly to firmware (not shown).

Operation of the network element 10 will now be described in overview. The element 10 is operable to provide power leveling control of up to 32 communication channels accommodated by the element 10, the channels being at wavelength spacings of substantially 100 GHz. "Leveling" here refers to controlling the radiation power of radiation corresponding to each of the channels to within predetermined limits. The element 10 is controlled by firmware (not shown in FIG. 1) which communicates either via the FPGA 40 or directly with the CCU 60, the transponders 90, 92, 94 and the modules included in the expansion shelf 70 and the expansions area 80. The firmware instructs them regarding which communication channels they can use when outputting radiation, and manages when they can start and terminate transmitting communication traffic on a particular channel allocated thereto. The firmware attempts to prevent two or more of the modules, transponders or CCU from operating on identical channels simultaneously which would result in radiation interference in the EDFA 20 and subsequent loss of information relating to such channels.

Radiation of channels transmitted through the CCU 60, and radiation output from the transponders 90, 92, 94 and the modules of the expansion shelf 70 and of the expansion area 80 is coupled as composite radiation into the fibre 135 and propagates to the EDFA 20. The EDFA 20 amplifies the composite radiation and outputs amplified composite radiation at its output port into the fibre waveguide 110. A portion of the amplified composite radiation is coupled to the output tap point $O_1$ wherefrom the portion propagates through the fibre waveguide 170 to the optical input port $O_2$ of the detector 30. The detector 30 is operable to measure the radiation power of radiation input at the Port $O_2$ and to output data describing radiation power in each of the channels to the FPGA 40. Under control from the firmware, the FPGA 40 instructs the CCU 60, the transponders 90, 92, 94, and the modules in the expansion shelf 70 and the expansion area 80 regarding radiation wavelength and power level that they are permitted to transmit or emit radiation; the FPGA 40 sends its instructions out via the bus 50.

The FPGA 40 thus provides power control which ensures that radiation clashes do not occur in the EDFA 20, and that the channels have associated therewith radiation of mutually similar radiation power when in use so that the EDFA 40 and similar EDFAs connected down-stream to the fibre waveguide 110 are not overloaded. The FPGA 40 is also operable to check whether or not the transponders 90, 92, 94 and the modules are mistuned when they commence transmitting at the wavelength of any of the channels indicated by the FPGA 40.

When performing its leveling function, the FPGA 40 communicates to the CCU 60, the transponders 90, 92, 94 and the modules at an interval of 1 ms. The FPGA 40 sends repetitively a stream of 32 bytes of command data as provided in Table 1; Channel 1 data is sent at the start of the stream, Channel 2 data thereafter and so on until Channel 32 data at the end of the stream.

TABLE 1

| Channel 1 data | Channel 2 data | ... and so on until ... | Channel 31 data | Channel 32 data |
| --- | --- | --- | --- | --- |

Thus, the stream comprises 32 bytes in total and repeats every 1 ms. Each byte is structured as provided in Table 2 (located at the end of the description) and includes bit 0 to bit 7 where the bit 7 is a leading bit and the bit 0 is an end bit of each byte.

As each byte is sent from the FPGA 40 using isocronous data packets, there is no confirmation back to the FPGA 40 that the byte reaches its intended destination. For example, loss of data sent from the FPGA 40 can occur if the bus 50 is for any reason reset.

End bit 0 and bit 1 are used to ensure that data commands are executed at the CCU 60, the transponders 90, 92, 94 and the modules. The bits 0, 1 form a binary value ID where bit 1 is more significant than bit 0. Whenever a new command is sent from the FPGA 40, the ID value is incremented by 1 count. When the ID value reaches a binary value 11, it is incremented on the next command to a binary value 00, namely the ID value is incremented in a modulo-4 manner. Thus, the stream is repeated on a 1 ms basis with similar ID value until the FPGA 40 updates the stream with a new command when it increments the value of ID. Such updating corresponding to a new command being issued from the FPGA 40 and is performed at a time interval in a range of 1 ms to 1 second. The repetitive stream is received at the CCU 60, the transponders 90, 92, 94 and the modules which monitor the stream and identify when a new command is issued by the FPGA 40 and will store the command and act upon it as appropriate.

Thus, if the CCU 60, the transponders 90, 92, 94 and the modules should miss several streams, for example 10 consecutive streams, during an interruption of the bus 50, it will not receive new ID bits. When the interruption has ended, the CCU 60, the transponders 90, 92, 94 and the modules will again receive new ID values and then respond to the new command as appropriate.

Bit 2 is used by the FPGA 40 to indicate whether a byte in the stream relates to the transponders 90, 92, 94 or to the CCU 60; a value 0 for bit 2 corresponds to the CCU 60 whereas a value 1 corresponds to the transponders 90, 92, 94 or the aforementioned modules.

Bits 3 to 6 determine the command itself and concern an incremental change in emitted radiation power or an absolute emitted power setting, for example "channel off". Incremental changes conveyed in the data stream are graded relatively in size, namely a tiny step being at a first low size limit and a huge step at a second high size limit. Small, medium, large, extra large (X large) are intermediate step sizes in sequence from the first limit to the second limit. A null, namely bits 6-3 being 0000 respectively, is transmitted when correction to emitted or transmitted radiation power output is not required. However, a "channel off" command, namely bits 6-3 being 0001 respectively, is transmitted when a channel is to be turned off. When "null" and "channel off" commands are issued, bit 7 is set to a zero value to avoid the commands as being interpreted as "absolute power" commands.

Bit 7 determines whether a byte in the stream corresponds to an instruction for incremental increase in emitted radiation power or setting the CCU 60, the transponders 90, 92, 94 or the modules to an absolute level of emitted radiation power.

As described in the foregoing, the FPGA 40 is operable to monitor radiation power in channels output from the EDFA 20. The FPGA 40 functions by monitoring whether or not its most recent commands issued via the bus 50 have been responded to. For example, if the FPGA 40 issues a command via the bus 50 to the CCU 60 to change radiation power transmission therethrough for a specific channel by 1 dB, the FPGA 40 will monitor the portion of composite radiation input to the detector 30 for up to 4 repeats of the stream to check that the change has been implemented; if at least 50% of the change has been implemented within these four repetitions, the command is deemed to have been responded to correctly.

The CCU 60, the transponders 90, 92, 94 and the modules are also operable to monitor the stream received thereat from the bus 50. If changes in the ID value do not occur, then the CCU 60, the transponders 90, 92, 94 and the modules function to interpret such a lack of changes as failure of the FPGA 40 or its associated bus 50.

Now operation of the network element 10 will be described when it adds or subtracts a channel. When addition occurs of a channel to the network element 10 where the element 10 presently has allocated in it less than 32 channels, there being a maximum allowable limit of 32 channels as described in the foregoing, a method is adopted to operate the element 10 so that disruption of existing established channels does not arise.

Addition of a new channel requires interaction between the firmware and the FPGA 40 regarding which part of the element 10 is to output radiation corresponding to the new channel. The firmware checks via the bus 50 that the part of the element 10, for example the transponder 90, is presently receiving "channel off" commands in the stream from the FPGA 40. If this is not so, it is likely that the part is presently conveying communication traffic and that resetting it would disrupt established communication traffic passing through the element 10.

Once the FPGA 40 confirms to the firmware that the new channel can be added, the firmware sends a series of messages to the part of the element 10 via the EEEE1394 bus instructing it to proceed to add the new channel. There then follows a controlled sequence of commands where the FPGA 40 controls an incremental increase of output radiation power corresponding to the new channel; the sequence of commands ensures that the new channel is increased promptly in power to a predetermined limit without overshooting in power or providing a sudden burst of radiation power to the EDFA 20 disrupting its operation and corrupting communication traffic presently propagating therethrough. The sequence of commands comprises the following steps:

Step 1:

The FPGA 40 sends a command via the stream conveyed through the bus 50 to the part of the element 10 to set it to an absolute level (bit 3=1). The part responds by emitting radiation at a wavelength corresponding to the new channel but at a low radiation power level, "low" corresponding to just sufficiently large for the detector 30 to detect and provide non-zero power measurements to the FPGA 40 but insufficiently powerful to disrupt established channels if the part is mistuned and generates output radiation at a wavelength not corresponding to the new channel. "Low" in the context of the element 10 is in the order of −25 dBm.

Step 2:

The FPGA 40 then checks that sending commands to the part has resulted in an increase in power corresponding to the new channel. Such a check is necessary because, if the part is mistuned, further increases in power could disrupt existing established channels in the element 10.

Step 3:

When the FPGA 40 has established that the part is emitting radiation at a wavelength corresponding to the new channel, the FPGA 40 issues commands via the bus 50 to the part, starting initially with relatively larger step sizes, for example huge or X large steps, and then progressively using smaller step sizes, for example small steps, to increase the radiation power output from the part as detected by the detector 20 for the new channel; the commands are issued by the FPGA 40 until the radiation power of the new channel approaches a predetermined target power level. Such a graduated increase in power provides a benefit that overshoot in radiation power for the new channel is substantially avoided; overshoot would inevitably occur if the FPGA 40 were to send commands only specifying huge or large steps.

Step 4:

When the part is emitting radiation amplified by the EDFA 20 to within one small step of the target power level, the FPGA 40 switches to a controlling mode of operation where a relatively narrow 1 dB limit is set for a degree that the part can be instructed to reduce or increase its radiation output. In the controlling mode, radiation power in the new channel is no more than a small step size away the target power level. Each active channel of the network 10 has associated therewith an internal power drift register in the FPGA 40; a register for the new channel is set to zero value and the new channel is allowed to drift regarding its radiation output power level. For every active channel within the network element 10, the FPGA 40 accumulates a record of all the step sizes it issues in commands via the bus 50; for example, if the following steps were issued in commands: +0.02 dB, +0.02 dB, +0.02 dB, −0.08 dB, +0.04 dB, a register recording these commands would contain a value +0.02 dB. If the radiation power level is somewhat low for the new channel, and a step up is required to be issued from the FPGA 40 to restore the new channel to within the aforementioned 1 dB limits, the FPGA 40 checks the power drift register for the new channel to establish whether or not it would overflow if the step up were issued as a command. If overflow were to occur, a step size would then be selected by the FPGA 40 that would not cause the power drift register to exceed the aforementioned 1 dB limits. A channel control out of range alarm is raised by the FPGA 40 when one or more of the power drift registers is at or beyond its 1 dB limit. Such a feature prevents the FPGA 40 from issuing excessive step up commands via the bus 50 to compensate for temporary attenuation effects, for example temporary attenuation arising on account of a bent or broken fibre waveguide. However, the FPGA 40 is also designed to enable it to compensate for anticipated power drift over element 10 part lifetimes; in order to achieve such long-term compensation, the power drift registers are periodically checked to determine if they contain values of 0.75 dB or more. If one or more of them do contain such a value, the values of these one or more registers are reduced by 0.01 dB, thereby causing the one or more registers to drift back to zero over a longer time scale. Such drift towards zero value enables the FPGA 40 to accommodate any slow attenuation or power drift within the element 10 and communication parts connected thereto; "slow" in this context means a rate of less than 0.01 dB/second.

Step 5:

The FPGA 40 maintains radiation power on a per channel basis not only for the new channel but also for existing established channels of the element 10. Although the stream is repetitively transmitted via the bus 50 each 1 ms, different parts of the element 10 exhibit mutually different response times. For example, the transponders 90, 92, 94 are capable of responding within a few tens of milliseconds whereas the CCU 60 can require up to 200 ms to respond on account of time taken for the opacity of the matrix to alter under electronic control. The FPGA 40 is designed to cope with these different response times.

Steps 1 to 5 above describe the sequence.

After the new channel has been added and subsequently level controlled, the FPGA 40 records details regarding the channel and the part providing its radiation. Such recording avoids the FPGA 40 over a longer period providing instructions to increase radiation power cumulatively to more than 1 dB although, as described above, long term drift greater than 1 dB is accommodated by FPGA 40; this recording protects the EDFA 20 from being overloaded over a relatively shorter time period. An example scenario will now be described:

Radiation for the new channel is provided by a module in the expansion shelf 70; the new channel is being controlled in the controlling mode. The fibre waveguide 120 is then disturbed causing an increase in attenuation. The FPGA 40 then attempts to correct for a decrease in radiation associated with the new channel detected at the detector 30 by increasing radiation output power of the module. A few minutes later, the waveguide 120 is disturbed again and attenuation in the waveguide 120 reduces back to its original level before being disturbed. The power in the new channel received by the EDFA 20 will now be 1 dB which can result in amplification for other channels propagating through the EDFA 20 being consequently reduced due to power hogging within the EDFA 20. The FPGA 40 can in such circumstances raise an alarm and issue instructions via the bus 50 for the module providing radiation of the new channel to be shut down and cease emitting radiation at the wavelength associated with the new channel.

It is for avoiding severe hogging effects under fault conditions that the aforementioned limits have been set at a value of 1 dB for shorter term drift.

When the new channel is to be removed from the element 10, the firmware sends a message to the module via the bus 50 including "channel off" commands to which the module responds.

For safety purposes, in an event of a fibre connected to the element 10 becoming broken, for example the fibre 100, an ALS command is issued to the FPGA 40 which immediately issues commands via the bus 50 to all parts of the element 10 to cease emitting radiation or transmitting radiation.

The EDFA 20 and the detector 30 are separately temperature controlled. In particular, the EDFA 20 is temperature controlled so that it cannot operate at relatively high temperatures where its operating lifetime is reduced.

The detector 30 must be operating within a temperature range where it provides accurate measurement of radiation power output from the EDFA 20 for each of the channels, otherwise there is a risk that the element 10 can cause overload in optical communication equipment down-stream. The element 10 is operable to communicate with the firmware that it is in temperature calibration, in other words in "temperature lock". If the element 10 subsequently drifts out of temperature lock, it raises an alarm because it can no longer guarantee its power leveling functions for its channels. The FPGA 40 in such a situation will issue null commands in the stream to all parts of the element 10 capable of generating or transmitting channel radiation; such operation is referred as a "free run" mode. The firmware or an operator can then decide to shut down the element 10 or allow it to continue in its "free run" mode.

The FPGA 40 is operable to monitor radiation of channels output at the EDFA 20 which are nominally supposed to be switched off. If the FPGA 40 in combination with the detector 30 detects radiation corresponding to one or more of these switched off channels, the FPGA 40 sends an alarm to the firmware that the one or more channels should not be used.

The FPGA 40 is also operable to monitor radiation of channels output at the EDFA 20 and issue commands to switch off channels whose radiation power exceeds a predetermined power level.

The FPGA also includes digital averaging for filtering noise and data traffic power fluctuations associated with measuring radiation power at the output of the EDFA 20. When the FPGA 40 is adding a new channel, such averaging has associated therewith a shorter time constant relative to averaging performed when the new channel is under leveling control within its 1 dB limits. Such changing of the time constants enables the element 10 to respond more rapidly when channel radiation power levels are supposed to be changing, for example when a new channel is added.

In order to further elucidate operation of the element 10 with regard to STEPs 1 to 5 above, reference will now be made to FIG. 2 which is a graph of power leveling control provided by the element 10 illustrated in FIG. 1; the graph is indicated by 300 and includes an abscissa axis 310 denoting time and an ordinate axis 320 denoting radiation output power in the new channel as measured at the output of the EDFA 20. Along the axis 310, there are four time points marked, namely $t_0$, $t_1$, $t_2$, $t_3$ where the point $t_0$ precedes the point $t_3$ in time.

During a time interval between the points $t_0$ and $t_1$, the firmware checks that a part of the element 10 identified for providing radiation for the new channel is presently receiving "channel off" commands. During a time interval between the points $t_1$ and $t_2$, the part outputs radiation at a level of −25 dBm which is insufficiently powerful to disrupt established channels within the element 10, but sufficiently powerful to be just detected by the detector 30 in cooperation with the FPGA 40; the FPGA 40 checks that the radiation is output at a wavelength corresponding to the new channel. In a time interval between the points $t_2$ and $t_3$, the FPGA 40 issues incremental power increase commands to the part, for example starting with huge steps and progressively reducing step sizes to large and then to small for avoiding overshoot. After the time point $t_3$, the element 10 reverts to leveling control operation where a target power of PT is to be maintained within 1 dB power limits.

It will be appreciated that modification can be made to the network element 10 without departing from the scope of the invention. For example, the step sizes corresponding to bits 6 to 3 can be modified from those provided in Table 2. Moreover, the 1 dB power limit for leveling control can be in a range 0.5 to 2 dB when the element 10 is designed to be more tolerant to radiation power variations; however, the range can be extended further if the element 10 and its associated system can tolerate higher degrees of overload. Although, only three transponder 90, 92, 94 are illustrated in FIG. 1, the element 10 can incorporate other numbers of transponders. The expansion shelf 70 and the expansions area 80 can be equipped with a variety of different types of modules for outputting channel radiation. Moreover, the element 10 can be operated so that it adds more than one new channel simultaneously.

TABLE 2

| Most significant bit 7 Power | Bit 6 | Bit 5 | Bit 4 | Bit 3 Step size | Bit 2 Channel destination | Bit 1 | Least significant bit 0 Message Identification |
|---|---|---|---|---|---|---|---|
| 0 => incremental mode | 0 | 0 | 0 | 0 (Null) | 0 => CCU 60 | 0 | 0 (ID 0) |
|  | 0 | 0 | 0 | 1 (Channel off) |  |  | 1 (ID 1) |
| 1 => absolute mode | 0 | 0 | 1 | 0 (+Tiny step) | 1 => transponders 90, 92, 94 | 0 | 0 (ID 2) |
|  | 0 | 0 | 1 | 1 (+Small step) |  |  | 1 (ID 3) |
|  | 0 | 1 | 0 | 0 (+Medium step) |  | 1 |  |
|  | 0 | 1 | 0 | 1 (+Large step) |  |  |  |
|  | 0 | 1 | 1 | 0 (+X large step) |  | 1 |  |
|  | 0 | 1 | 1 | 1 (+Huge step) |  |  |  |
|  | 1 | 0 | 0 | 0 (−Tiny step) |  |  |  |
|  | 1 | 0 | 0 | 1 (−Small step) |  |  |  |
|  | 1 | 0 | 1 | 0 (−Medium step) |  |  |  |
|  | 1 | 0 | 1 | 1 (−Large step) |  |  |  |
|  | 1 | 1 | 0 | 0 (−X large step) |  |  |  |
|  | 1 | 1 | 0 | 1 (−Huge step) |  |  |  |
|  | 1 | 1 | 1 | 0 (Spare) |  |  |  |
|  | 1 | 1 | 1 | 1 (Spare) |  |  |  |

The invention claimed is:

1. A power controlling network element for a wavelength division multiplex (WDM) communication system in which radiation propagating in the system is partitioned into a plurality of wavebands, each waveband being associated with an optical channel, the element being operative for controlling a power of one or more optical channels being transmitted through the element and for controlling a power of one or more optical channels being added at the element, the element comprising:
   a) measuring means for measuring the power of each optical channel output from the element, the power of a new optical channel being newly added at, or newly transmitted through, the element being initially at a level insufficient to disrupt existing optical channels;
   b) a channel control unit for selectively transmitting to an output of the element the one or more optical channels of input radiation received from the system, and for individually controlling the power of said one or more optical channels transmitted to the output;
   c) generating means for generating and controlling the power of the one or more optical channels being added at the element, and for emitting said one or more optical channels to the output; and
   d) controlling means for receiving data from the measuring means indicative of the power of each optical channel output from the element, and for controlling the power of each optical channel to within predetermined power limits by increasing the power in a stepwise incremental manner, thereby reducing power overshoot in said one or more optical channels,
   wherein the controlling means is operable for monitoring data corresponding to the radiation received at the measuring means, for determining whether or not unintended radiation is present at radiation wavelengths corresponding to optical channels which at least one of the channel control unit and the generating means has not been instructed to respectively transmit or generate, and for instructing the at least one channel control unit and the generating means not to transmit or emit radiation at radiation wavelengths corresponding to the unintended optical channel.

2. A power controlling network element for a wavelength division multiplex (WDM) communication system in which radiation propagating in the system is partitioned into a plurality of wavebands, each waveband being associated with an optical channel, the element being operative for controlling a power of one or more optical channels being transmitted through the element and for controlling a power of one or more optical channels being added at the element, the element comprising:
   a) measuring means for measuring the power of each optical channel output from the element, the power of a new optical channel being newly added at, or newly transmitted through, the element being initially at a level insufficient to disrupt existing optical channels;
   b) a channel control unit for selectively transmitting to an output of the element the one or more optical channels of input radiation received from the system, and for individually controlling the power of said one or more optical channels transmitted to the output;
   c) generating means for generating and controlling the power of the one or more optical channels being added at the element, and for emitting said one or more optical channels to the output; and
   d) controlling means for receiving data from the measuring means indicative of the power of each optical channel output from the element, and for controlling the power of each optical channel to within predetermined power limits by increasing the power in a stepwise incremental manner, thereby reducing power overshoot in said one or more optical channels,
   wherein when an optical channel is to be newly added at, or newly transmitted through, the element, the controlling means is operable for instructing the generating means to initially generate the new optical channel at a power level sufficient for the measuring means to detect but insufficient to disrupt existing optical channels transmitted or generated by the element.

3. The element according to claim 2, wherein the new optical channel is initially at a power level sufficient for the measuring means to detect; wherein the measuring means is operable to measure a wavelength of the new optical channel; and wherein the controlling means is operable to determine whether the new optical channel is mistuned and, when the new optical channel is not mistuned, the controlling means is operable to instruct at least one of the channel control unit and the generating means to increase the radiation power of the new channel in a stepwise incremental manner.

4. The element according to claim 3, wherein the controlling means is operable to instruct the at least one of the channel control unit and the generating means to increase the radiation power of the new optical channel initially in relatively larger incremental power steps, and then subsequently in progressively smaller power steps as the radiation power of the new optical channel approaches a predetermined power level.

5. The element according to claim 4, wherein the controlling means is operable to instruct the at least one of the channel control unit and the generating means to maintain the radiation power level of the new optical channel within an error band including the predetermined power level.

6. The element according to claim 5, wherein the controlling means is operable to generate an alarm signal when the controlling means instructs the at least one of the channel control unit and the generating means to modify the radiation power of the new optical channel cumulatively by more than the error band.

7. The element according to claim 6, wherein the error band is modified to accommodate longer-term ageing and drift within the element.

8. The element according to claim 2, wherein the radiation received at the measuring means is a portion of radiation output from the element to the communication system.

9. The element according to claim 8, including optical amplifying means for amplifying the radiation output from the channel control unit and the generating means to provide the radiation output from the element, the amplifying means including a subsidiary output for providing the portion of radiation for the measuring means.

10. The element according to claim 2, wherein the controlling means is operable to output instructions repetitively to the channel control unit and the generating means, the instructions including identification means which is incremented when a new command is issued.

11. The element according to claim 2, wherein the controlling means is implemented as a field programmable gate array (FPGA).

* * * * *

UNITED STATES PATENT AND TRADEMARK OFFICE
CERTIFICATE OF CORRECTION

PATENT NO. : 7,254,339 B2
APPLICATION NO. : 10/239381
DATED : August 7, 2007
INVENTOR(S) : Cook et al.

It is certified that error appears in the above-identified patent and that said Letters Patent is hereby corrected as shown below:

In Column 6, Line 64, delete "EEEE1394" and insert -- IEEE1394 --, therefor.

In Column 8, Line 36, delete "sequence." and insert -- sequence, as outlined in the flow chart of Figure 3. --, therefor.

Signed and Sealed this

Twenty-second Day of December, 2009

David J. Kappos
*Director of the United States Patent and Trademark Office*